United States Patent [19]
Cullen

[11] Patent Number: 4,671,477
[45] Date of Patent: Jun. 9, 1987

[54] DEVICE FOR HANDLING A WORKPIECE SUCH AS A CONTAINER FOR CHEMOTHERAPY DRUGS OR THE LIKE

[76] Inventor: Thomas J. Cullen, 215 Karen Dr., Elizabeth, Pa. 15037

[21] Appl. No.: 873,349

[22] Filed: Jun. 12, 1986

[51] Int. Cl.[4] .................... F16L 3/00
[52] U.S. Cl. .................... 248/122; 248/130; 248/313
[58] Field of Search .................... 248/122, 128, 130, 131, 248/313, 133, 139; 269/146, 147, 164, 254 R, 254 DK, 254 CS, 77, 78, 272

[56] References Cited

U.S. PATENT DOCUMENTS

| | | | |
|---|---|---|---|
| 632,381 | 9/1899 | Theadore | 269/78 X |
| 1,025,739 | 5/1912 | Davis | 269/272 |
| 1,447,877 | 3/1923 | Little | 248/122 X |
| 1,646,165 | 10/1927 | Naujoks | 248/122 |
| 1,680,560 | 8/1928 | McDonald | 269/78 X |
| 2,471,103 | 5/1949 | Franks | 269/254 X |
| 2,949,947 | 8/1960 | Story | 269/254 CS X |
| 3,577,682 | 5/1971 | Kulischenko | 269/254 CS X |

FOREIGN PATENT DOCUMENTS

| | | | |
|---|---|---|---|
| 749874 | 8/1933 | France | 269/254 CS |

*Primary Examiner*—J. Franklin Foss
*Attorney, Agent, or Firm*—Webb, Burden, Robinson & Webb

[57] ABSTRACT

A device for handling a workpiece, such as a container for chemotherapy drugs, comprises a base plate, a vertical post extending from the base plate, a support barrel rotatably connected at one end to a support member which slidably engages with the vertical post, and a shaft that is biased within the support barrel to partially extend through and outwardly beyond the end of the support barrel opposite the support member. The device further comprises a first jaw member extending downwardly through the support barrel and connected to the shaft for relative movement therewith and a second jaw member opposed to the first jaw member and affixed to the end of the support barrel opposite the support member. Preferably, the second jaw member connects to a clamping means which slidably engages with the support barrel intermediate the first jaw member and the end of the support barrel opposite the support member. Each jaw member includes a vertical frame from which a plurality of spaced tine pairs extend. In the preferred embodiment, the jaw members are at least partially covered with a cushioning and gripping material.

6 Claims, 7 Drawing Figures

DEVICE FOR HANDLING A WORKPIECE SUCH AS A CONTAINER FOR CHEMOTHERAPY DRUGS OR THE LIKE

FIELD OF THE INVENTION

This invention relates to a device for handling a workpiece. More particularly, the device is used to handle a container for chemotherapy drugs such as an ampoule, vial or the like. The device may also be used to handle a container of radioactive matter or other dangerous materials.

BACKGROUND OF THE INVENTION

Workpiece handling devices have been known for centuries. Numerous types of spinners, holders or carriers have been developed depending upon the size, shape and weight of the item or items to be spun, held or carried. For example, in U.S. Pat. No. 2,471,103, a device for holding watch movements of various sizes and shapes is disclosed. The device comprises a first pair of stationary pins extending upwardly from a permanent base. A second pair of pins connect to a block beneath the base and move simultaneously with a slidable push rod having an actuating knob located at the forward end of the base. Watch movements are held between the four pins during inspection and repair. The device disclosed in U.S. Pat. No. 2,471,103 does not provide any support beneath the main body of the watch movement or workpiece, however. Nor does the patent teach rotation or variable height adjustment of the device or workpiece held therebetween.

A straight beam adjustable jaw clamp taught in U.S. Pat. No. 2,949,947 includes a pair of parallel spaced bars upon which a plurality of workpieces are supported. The clamp includes a first fixed jaw and second jaw adjustable relative to the spaced bars. Each of said jaws has a workpiece-engaging face covered by resilient facing material such as rubber or felt. Since the clamp disclosed requires only one hand for operation, the other hand of the clamp operator is freed. However, the clamp disclosed in U.S. Pat. No. 2,949,947 is not separately rotatable or height adjustable. The patented clamp also teaches jaw adjustment and handle-biasing means which are substantially different from the device herein.

In laboratory environments, there is also a need for workpiece handling devices which promote worker efficiency and safety. For example, when laboratory containers must be held in either extreme temperature conditions or for extended periods of time with little or no movement, container holders are irreplaceable. U.S. Pat. Nos. 2,693,015 and 2,914,831 teach laboratory container holders which adjust to variable heights. With these holders, test tubes and flasks are handled during heating, mixing or other activities. Specifically, both patents disclose a band which wraps around the neck of the container to be held. Remaining slack in the band is taken up within a bar and tensioned by a nut or other securing means. Neither patent teaches means for easily removing the laboratory container from the holder nor for supporting the container from beneath.

In the pharmaceutical setting, handlers of chemotherapy drugs must take special precautions to insure their safety as well as those of the drug recipient. Chemotherapy drugs are the most potent and toxic drug class on a milligram per milligram basis currently available. Many of these drugs are teratogenic (producing birth defects); carcinogenic (known cancer producing agents in man); and/or genotoxic (may produce irreversible chromosomal damage). The patients to whom these drugs are administered receive them only after dilution or at a much slower rate through the vein so that blood flow further dilutes the concentration. Typically, the patients receiving chemotherapy drugs are immunosuppressed through the use of other drugs. Therefore, pharmacists and other drug handlers must be especially careful to insure that patients receive sterile drug dosages free of bacteria and other foreign matter.

Because of the need to protect both the recipient and the chemotherapy drug handler, the pharmaceutical laboratory work area includes a biological safety cabinet or hood having a downward vertical air flow therebeneath. An absorbent pad is placed directly beneath the air flow and over the area where the drug handler prepares precise patient dosages. Recently adopted OSHA guidelines further recommend that individual handlers of chemotherapy drugs wear hydrophobic gowns and surgical latex gloves. Most chemotherapy drugs are stored and transferred either in vials which operate under a negative pressure system or in glass ampoules having tap necks that must be broken. When extracting drugs from these containers, drug handlers should not disrupt the downward flow of air onto the work area or otherwise risk contamination of the patient dosages which they prepare. Hence, chemotherapy drug handlers should operate from beneath the containers or parallel to the work surface to insure dosage sterility but as far away from the containers as is physically possible to reduce their own risks to accidental exposure.

There are no known devices for handling chemotherapy drug containers at this time. Rather, present safety techniques require the handler to hold a vial or opened ampoule in one hand and insert a filter straw or needle into the container with the other hand. While under the downward air flow of the safety cabinet, the handler should then extract the needle plunger using only his/her thumb. This technique becomes tiresome and may result in handler deviations from recommended procedures. Even with the above precautions, chemotherapy drug handlers are nevertheless susceptible to exposure either through inhalation of an aerosol (or spray) of the drug or by direct skin contact with open containers, broken glass or needle tips.

For the chemotherapy drugs stored in vials, chemo pins were developed to equate the pressure from within the vial thereby reducing the possibility of handler exposure from drug aerosolization. These chemo pins are rather costly to maintain in constant supply, however.

SUMMARY OF THE INVENTION

This invention relates to a device for handling a workpiece such as a container for chemotherapy drugs or the like. The device comprises a base plate, a vertical post extending from the base plate, a support barrel rotatably connected at one end to a support member which slidably engages with the vertical post and a shaft that is biased within the support barrel to partially extend through and outwardly beyond the end of the support barrel opposite the support member. The device further comprises a first jaw member which extends downwardly through the support barrel and connects to the shaft for relative movement therewith and a second jaw member opposed to the first jaw member.

The second jaw member may be affixed to the end of the support barrel opposite the support member. Alternatively, the second jaw member connects to a clamping means which slidably engages with the support barrel intermediate the first jaw member and the end of the support barrel opposite the support member.

In the preferred embodiment, the support barrel, shaft, vertical post and both jaw members are made of a lightweight yet sturdy material, such as aluminum. A base plate made of steel provides sufficient weight and a low center of gravity to thus anchor and stabilize the device during use. The support barrel includes at least one substantially planar surface having a channel through which the first jaw member extends. Each jaw member includes a vertical frame from which a plurality of spaced tine pairs extend. Most preferably, the time pairs of the first jaw member are staggered relative to the tine pairs of the second jaw member so as to intermesh when the jaw members are urged towards each other in a rest position. The tine pairs may be covered with a cushioning and gripping material such as foam, plastic, rubber or felt.

For ease in operation, the device includes a handle attached to the end of the shaft protruding outwardly beyond the support barrel. With this handle, the operator may rotate the support barrel of the device a full 360° in either a clockwise or counterclockwise direction relative to the support member. This same handle may also be forced inwardly into the support barrel to move the first jaw member away from the second jaw member and into a loading and unloading position. In this latter position, an ampoule or vial containing a chemotherapy drug (or other dangerous material) may be rested on the planar surface nearer the first jaw member for loading. The handle is then slowly released until the jaw members close about the container. The preferred embodiment of the invention further includes means for adjusting the resistance of rotation of the support barrel relative to the support member.

It is a primary object of this invention to provide handlers of dangerous materials with a third, helping hand in the pharmaceutical laboratory environment. By holding a container between the jaw members of this device, chemotherapy drug handlers may use their free hand for other activities, such as assisting with the extraction of drugs from the container. The benefits gained from incorporating this device into existing procedural techniques are measurable. Patient dosages may be prepared at rates about 38–63% faster than by conventional means. Also, individual drug handlers can work with more mental assurance that they will not be accidentally exposed to dangerous drugs since they will be further away from open containers, broken glass and needle tips.

This invention has advantages at the administrative level as well. The device does not violate the air flow patterns beneath existing safety cabinets or hoods. Hence, the sterility of patient dosages is preserved, if not enhanced. Unlike other pharmaceutical mechanisms. this device may be operated by either right-handed or left-handed personnel. The device decreases administrative costs by decreasing substantially the need for disposable chemo pins and by requiring very little maintenance on a one-time purchase. With improved handler technique, faster and safer dosage preparations result in increased employee productivity while decreasing hospital liability to both drug handlers and recipients.

DETAILED DESCRIPTION OF THE PREFERRED EMBODIMENTS

Figure 1:
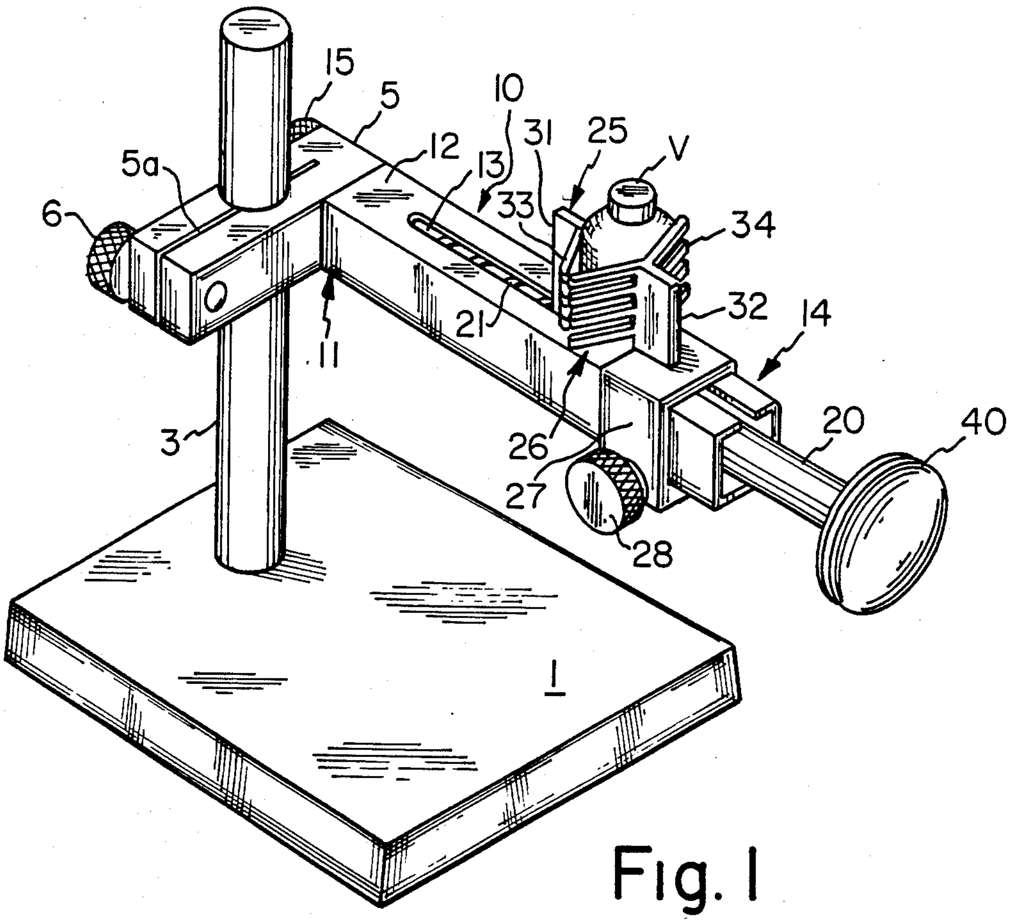
FIG. 1 is a perspective view of the device with a vial positioned between the jaw members.

This invention is directed to a device for handling a workpiece such as a container for chemotherapy drugs. More specifically, the device handles an ampoule, vial or the like. The device may also be used to handle a container of radioactive matter or other dangerous materials. The shaft, support barrel and number, size and shape of the jaw members may also be modified to accommodate other workpieces.

As fully shown in FIGS. 1–4, the device of the present invention includes a base plate 1 having a plurality of rubber skids 2 affixed to the bottom. The rubber skids 2 prevent the base plate 1 from sliding about and from damaging the surface upon which the device rests. A vertical post 3 extends upwardly from the base plate 1. In the preferred embodiment, post 3 extends perpendicularly from base plate 1 and detachably connects thereto. Most preferably, the base plate 1 is made of steel and post 3 of aluminum. The sufficient weight of a steel base plate 1 provides a low center of gravity to thus anchor and stabilize the device during use.

A support member 5 slidably engages with vertical post 3. The member 5 includes a transverse slot **5*a* which permits the member 5 to be tightened against post 3. The height of member 5 relative to the post is adjustably controlled by a height adjustment knob 6. When knob 6 is loosened, slot 5*a* widens to allow vertical movement of member 5 to the desired position along post 3**.

A support barrel, generally 10, rotatably connects to the member 5 at end 11 nearest member 5. The barrel 10 includes at least one substantially planar surface 12 having a channel 13 extending therethrough. The planar surface 12 of barrel 10 supports a workpiece from beneath during handling. Planar surface 12 also prevents the workpiece from falling completely through the jaw members, as further described herein, if the workpiece is prematurely released during loading. In the preferred embodiment shown in FIGS. 1–7, barrel 10 comprises a hollow, square tubing of aluminum with channel 13 extending through the center of planar surface 12 completely to the end 14 of barrel 10 (opposite end 11 and member 5). Alternatively, barrel 10 may have a polygonal cross-section with channel 13 extending only partially through a substantially planar surface thereof.

Figure 2:
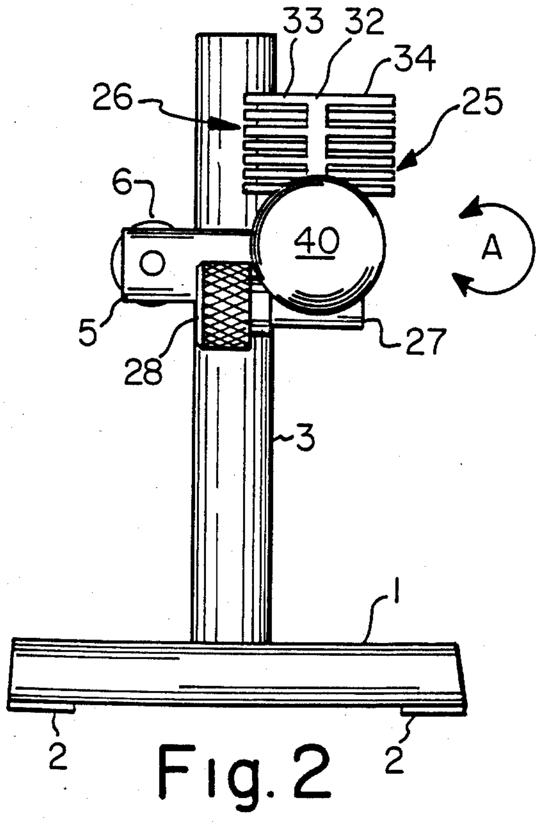
FIG. 2 is a front elevational view of the device.
Figure 3:
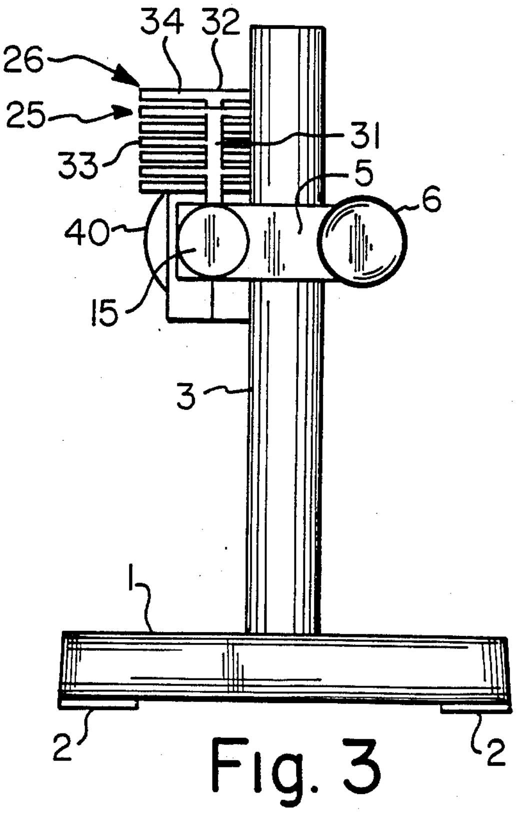
FIG. 3 is a rear elevational view thereof.

Barrel 10 of the device rotates a full 360° in either a clockwise or counterclockwise direction relative to member 5 as indicated by arrow A in FIG. 2. Hence, either left-handed or right-handed pharmacists and drug handlers may operate the device. In order to adjust the resistance of rotation of the barrel 10 about member 5, the device includes a tension resistance knob 15.

A shaft 20, biased by a spring 21 abutting the shaft 20 within barrel 10, partially extends through and outwardly beyond end 14 of the barrel 10. Preferably, the shaft 20 is made of a lighweight yet sturdy material, such as aluminum.

The device further comprises a pair of jaw members extending above the planar surface 12 of barrel 10. At least one of the jaw members is movable relative to barrel 10 so as to urge the jaw members towards each other in a rest position or away from each other in a loading and unloading position. In the later position, a container, such as vial V in FIG. 1, is placed onto planar surface 12 between the jaw members. Thereafter, the shaft 20 is biased outwardly until the jaw members return to the rest position with vial V therebetween. More specifically, a first jaw member 25 extends downwardly through channel 13 of barrel 10 and connects to shaft 20 for relative movement therewith. A second jaw member 26 opposes first jaw member 25 and is affixed to end 14 of the barrel 10. Preferably, second jaw member 26 connects to a clamping means 27 which slidably engages with the barrel 10 intermediate first jaw member 25 and end 14 of the barrel 10. The position of the clamping means 27 along barrel 10 is adjustably controlled by a horizontal positioning knob 28. Horizontal knob 28 loosens and retightens about barrel 10 in a manner similar to the operation of height adjustment knob 6. With knob 28, therefore, the amount of space between jaw members may be adjusted until the jaw members nearly contact when in the rest position as in FIGS. 4 and 7. The clamping means 27 may also be slid to the outermost edge of end 14 as shown in FIG. 5 so that the second jaw member 26 is in a most open rest position relative to the first jaw member 25. Clamping means 27 may also be positioned at any desired point between the above two extremes depending upon the dimensions of the workpiece to be handled.

Figure 4:
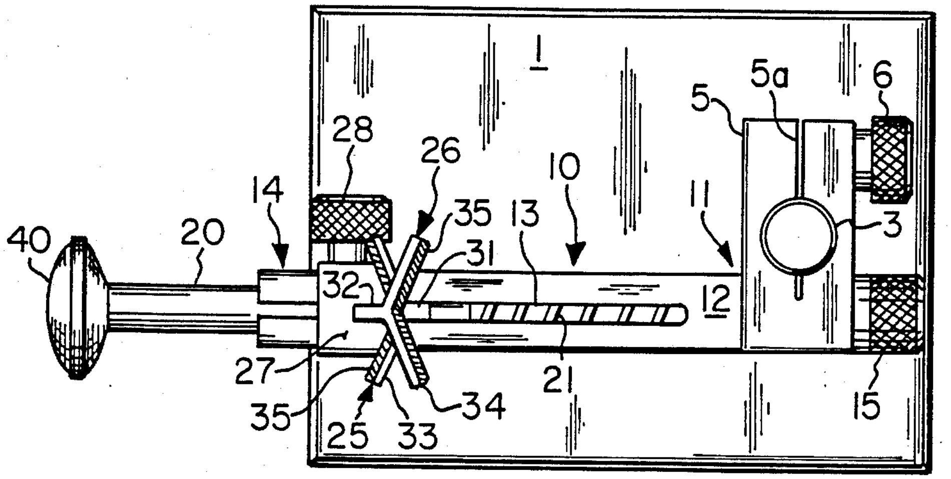
FIG. 4 is a top elevational view of the device with the jaw members partially covered with a cushioning and gripping material.
Figure 5:
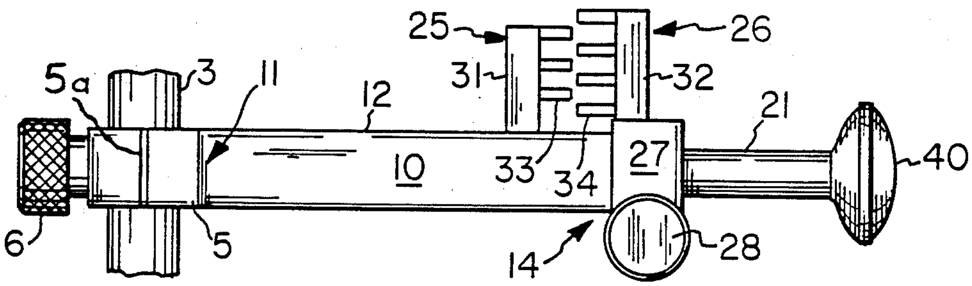
FIG. 5 is a side elevational view of a section of the device showing the second clamping means slidably engaged with the outermost end of the support barrel so that the second jaw member is in a most open rest position relative to the first jaw member.

As best seen in FIGS. 1 and 4, each jaw member comprises a vertical frame from which a plurality of spaced tine pairs inwardly extend. More particularly, vertical frame 31 of first jaw member 25 includes tine pairs 33 and vertical frame 32 of second jaw member 26 includes tine pairs 34, which oppose the tine pairs 33 of the first jaw member 25. In the preferred embodiment shown in FIGS. 4 and 6, the first and second jaw members are at least partially covered with a cushioning and gripping material 35 such as polyurethane foam, plastic, rubber or felt. Alternatively, particular tine pairs or an entire jaw member may be completely covered with a suitable material that will soften the contact of the tine pairs with the workpiece upon sudden accidental closure. This material may also enhance the grip of the tine pairs about the workpiece. Preferably, the first jaw member and second jaw member are made of aluminum. Most preferably, the tine pairs 33 of the first jaw member 25 are staggered relative to the tine pairs 34 of the second jaw member 26 so as to intermesh when the vertical frames 31, 32 are urged towards each other in the rest position.

Figure 6:
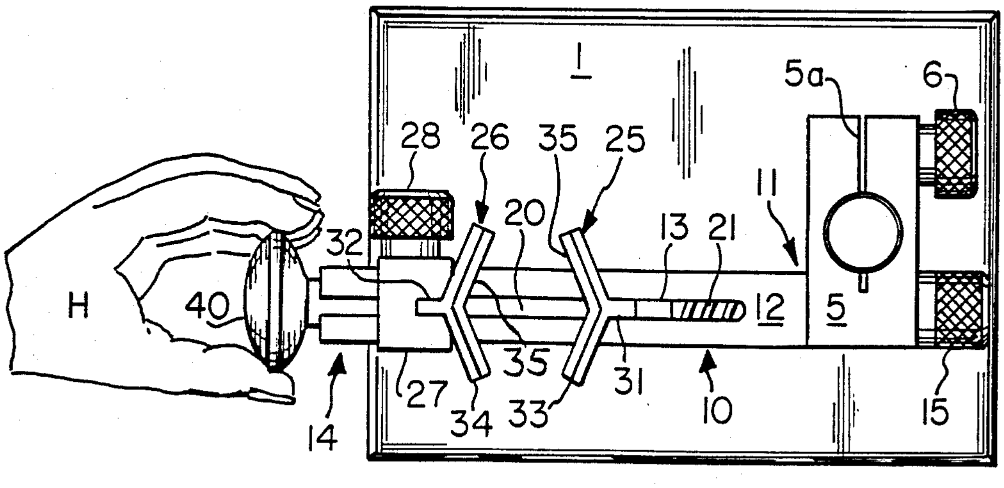
FIG. 6 is a top elevationl view of the device with the handle and shaft forced into the support barrel to move the first jaw member away from the second jaw member and into a loading and unloading position.
Figure 7:
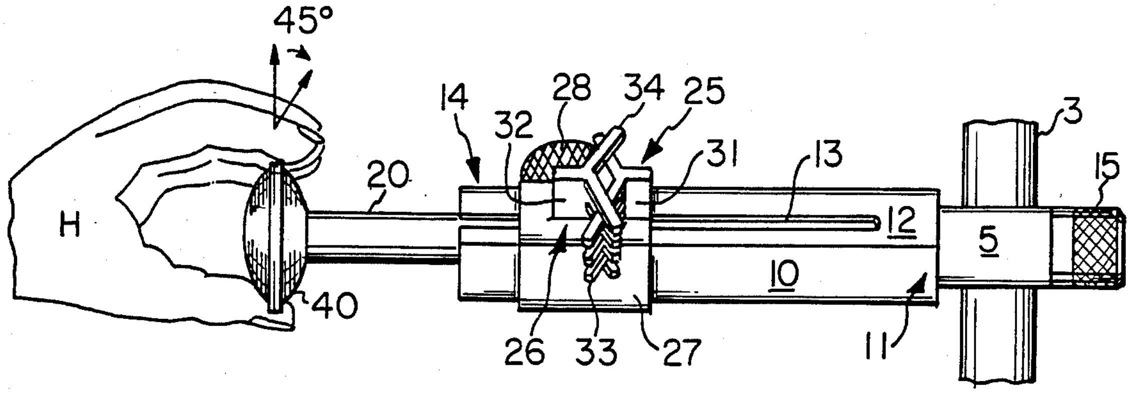
FIG. 7 is a side elevational view of a section of the device with the support barrel rotated approximately 45° in a clockwise direction relative to the support member.

For ease in operation, a handle 40 is attached to the end of shaft 20 that extends outwardly beyond barrel 10.. As shown in FIG. 6, an operator's hand H forces handle 40 and shaft 20 into barrel 10 to move the first jaw member 25 away from second jaw member 26 and into a loading and unloading position. Thereafter, a container for chemotherapy drugs may be rested on planar surface 12 between jaw members 25 and 26. The same handle 40 may also be used to rotate the barrel 10, jaw members 25, 26 and any container held therebetween a full 360° in either a clockwise or counterclockwise direction relative to member 5. In FIG. 7, hand H rotates the device 45° in the clockwise direction for illustrative purposes.

When the device is used properly, the possibility of accidental handler exposure to dangerous chemotherapy drugs is reduced. The invention keeps handlers further away from open containers broken glass and needle tips. With greater mental assurance of their safer working environment, handler technique will also be enhanced. Sterility of the prepared dosages is preserved since the device does not violate the downward flow of air beneath existing safety cabinets or hoods. Productivity improves because of a measurable increase in individual handler efficiency. On sample dosages prepared with the device as compared to preparation by conventional means, handler techniques were:

40% faster when preparing a dosage by extraction from one (1) ampoule;

63% faster when the more common extraction from two (2) ampoules is required; and 38% faster when preparing a dosage from a single 50 ml vial of chemotherapy drugs.

Because of improved handler techniques and preserved dosage sterility, hospital liability to both drug preparer and recipient is reduced. Administratively, by reducing handler risk to exposure by aerosolization, the device also decreases substantially the need for costly chemo pins. The device, which may be used by left-handed or right-handed personnel, is a one-time laboratory purchase only. Because of its steel and aluminum constriction, the device also requires very little maintenance.

Having presently described the preferred embodiments of this invention, it is to be understood that it may be otherwise embodied within the scope of the appended claims.

I claim:

1. A device for convenient and safe handling of containers for chemotherapy drugs by drug handlers comprising:
   - a base plate;
   - a vertical post extending upwardly from the base plate;
   - a support barrel rotatably connected at one end to a support member which slidably engages the vertical post, said support barrel including at least one substantially planar surface upon which a container can rest;
   - resistance means for resisting rotation of the support barrel about a longitudinal axis extending therethrough, whereby sufficient resistance may be applied to the support barrel to prevent rotation of the support barrel about its longitudinal axis and whereby additional torque applied to the support barrel by a drug handler will overcome the resistance of the resistance means and permit rotation of the support barrel about its longitudinal axis;

a shaft biased by a spring abutting the shaft within the support barrel so as to partially extend the shaft through and outwardly beyond an end of the support barrel opposite the support member;

a pair of jaw members extending above the planar surface of the support barrel, with the first jaw member attached to the shaft and being movable relative to the support barrel so as to urge the jaw members toward each other in a variable rest position or away from each other to a loading and unloading position; and a handle attached to the end of the shaft extending outwardly beyond the support barrel, whereby the support barrel can be rotated a full 360° in either the clockwise direction or counterclockwise direction about its longitudinal axis and whereby the shaft can be forced into the support barrel and move the first jaw member away from the second jaw and into the loading and unloading position.

2. A device as set forth in claim 1 wherein the second jaw member is connected to a clamping means which slidbly engages the support barrel intermediate the first jaw member and the end of the support barrel opposite the support member.

3. A device as set forth in claim 1 wherein the first jaw member and the second jaw member each include a vertical frame from which a plurality of spaced tine pairs extend.

4. A device as set forth in claim 3 wherein the tine pairs of the first jaw member are staggered relative to the tine pairs of the second jaw member so as to intermesh when the vertical frames of the jaw members are urged toward each other in a rest position.

5. A device set forth in claim 4 wherein the first and second jaw members are at least partially covered with a cushioning and gripping material.

6. A device set forth in claim 1 wherein the support barrel, the vertical post, the shaft and both jaw members are made of aluminum.

* * * * *